United States Patent
Ma

(10) Patent No.: US 9,465,764 B2
(45) Date of Patent: Oct. 11, 2016

(54) INTERFACE EXTENSION DEVICE COMPATIBLE WITH USB 2.0 AND USB 3.0 STANDARDS

(71) Applicant: Acer Incorporated, New Taipei (TW)

(72) Inventor: Chin-Shiang Ma, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 372 days.

(21) Appl. No.: 13/948,037

(22) Filed: Jul. 22, 2013

(65) Prior Publication Data

US 2014/0181353 A1 Jun. 26, 2014

(30) Foreign Application Priority Data

Dec. 24, 2012 (TW) .............................. 101149459 A

(51) Int. Cl.
*G06F 13/14* (2006.01)
*G06F 13/40* (2006.01)
*G06F 13/38* (2006.01)

(52) U.S. Cl.
CPC ......... *G06F 13/4045* (2013.01); *G06F 13/387* (2013.01); *G06F 13/4022* (2013.01)

(58) Field of Classification Search
CPC ........... G06F 13/4045; G06F 13/4022; G06F 13/387
See application file for complete search history.

(56) References Cited

U.S. PATENT DOCUMENTS

| | | | | |
|---|---|---|---|---|
| 6,738,382 B1* | 5/2004 | West | ................... | H04L 12/2859 370/401 |
| 7,484,018 B2* | 1/2009 | Szabelski | .............. | G06F 13/385 710/104 |
| 8,135,883 B2* | 3/2012 | Monks | .................. | G06F 13/387 710/38 |
| 8,615,611 B2* | 12/2013 | Hall | ...................... | G06F 13/385 710/66 |
| 2004/0252246 A1* | 12/2004 | Lee | ........................ | G06F 1/1632 348/725 |
| 2006/0056401 A1* | 3/2006 | Bohm | ................. | G06F 13/4022 370/360 |
| 2006/0059293 A1* | 3/2006 | Wurzburg | ........... | G06F 13/4022 710/313 |
| 2007/0255868 A1* | 11/2007 | Chahal | .................. | G06F 13/387 710/62 |
| 2013/0160039 A1* | 6/2013 | Mentz | .................. | H04N 21/418 725/14 |
| 2013/0275635 A1* | 10/2013 | Sip | ........................ | G06F 13/382 710/105 |

FOREIGN PATENT DOCUMENTS

TW 201145033 12/2011
TW M431475 6/2012

OTHER PUBLICATIONS

"AMD's Lightning Bolt: Low Cost Thunderbolt Alternative for USB 3.0/DP" by Anand Lal Shimpi on Jan. 12, 2012, retrived from http://www.anandtech.com/show/5413/amds-lightning-bolt-low-cost-thunderbolt-alternative-forusb-30dp#DATHORpllaFA2olo. 03.*
Taiwanese language office action dated Dec. 3, 2014.
English language translation of abstract of TW 201145033 (published Dec. 16, 2011).
English language translation of abstract of TW M431475 (published Jun. 11, 2012).

* cited by examiner

*Primary Examiner* — Jing-Yih Shyu
(74) *Attorney, Agent, or Firm* — McClure, Qualey & Rodack, LLP

(57) ABSTRACT

An interface extension device includes a USB port, a USB hub and a first interface conversion circuit. The USB hub has a first port connected to the USB port. The first interface conversion circuit includes first and second USB hosts. The first USB host is connected to the USB hub and is connected to the USB port through the USB hub. The second host has a bus and is directly connected to the USB port without routing though any USB hub.

5 Claims, 3 Drawing Sheets

INTERFACE EXTENSION DEVICE COMPATIBLE WITH USB 2.0 AND USB 3.0 STANDARDS

CROSS REFERENCE TO RELATED APPLICATION

This Application claims priority of Taiwan Patent Application No. 101149459, filed on Dec. 24, 2012, the entirety of which is incorporated by reference herein.

BACKGROUND OF THE INVENTION

1. Field of the Invention

The present invention relates to an interface extension device, and in particular, to an interface extension device compatible with USB 3.0.

2. Description of the Related Art

Recently, the design of notebook computer has trended towards a slimmer profile, and the bulky input and output (I/O) interfaces are removed, with only a few I/O interfaces being preserved in current designs in order to make the notebook thinner and lighter. For example, the network connector (i.e. RJ45 connection port) and VGA port are removed, leaving only a small number of USB ports or Mini display ports. However, users sometimes still need to use these removed I/O interfaces. Therefore, a dongle is conventionally used to provide users with the functions of I/O interfaces. Traditionally, a dongle compatible with USB 3.0 must have a USB 3.0 Hub configured to support the I/O interface of USB 3.0. However, the cost of the USB 3.0 hub is still high, such that the cost of a dongle compatible with USB 3.0 is too high.

BRIEF SUMMARY OF INVENTION

A detailed description is given in the following embodiments with reference to the accompanying drawings.

The present invention provides an interface extension device compatible with USB 2.0 and USB 3.0 standards. Also, the interface extension device only uses a USB 2.0 hub.

An embodiment of an interface extension device is disclosed. The interface extension device includes a USB port, a USB hub, and a first interface conversion circuit. The USB hub has a first port connected to the USB port. The first interface conversion circuit includes first and second USB hosts. The first USB host is connected to the USB hub and is connected to the USB port through the USB hub. The second USB host has a bus and is directly connected to the USB port without routing through any USB hub.

Another embodiment of an interface extension device is also disclosed. The interface extension device includes a USB port, a USB hub, a first interface conversion circuit, and a second interface conversion circuit. The USB hub has a first port connected to the USB port. The first interface conversion circuit includes a first USB host, a second USB host, and an interface converter. The first USB host is connected to the USB hub and connected to the USB port through the USB hub. The second USB host has a bus, and is directly connected to the USB port without routing through any USB hub. The interface converter is configured to convert the signal compatible with a lightning bolt interface to a display port signal. The second interface conversion circuit is configured to convert the display port signal to a VGA signal, and output the VGA signal to a VGA port. Wherein the USB hub further comprises a second port connected to a third interface conversion circuit, and configured to convert a USB signal from the first USB host to a network package, and convert the network package to the USB signal.

Another embodiment of an interface extension device is disclosed. The interface extension device includes a USB port, a USB hub, a first interface conversion circuit, and a second interface conversion circuit. The USB hub has a first port connected to the USB port. The first interface conversion circuit includes a first USB host, a second USB host, and an interface converter. The first USB host is connected to the USB hub and connected to the USB port through the USB hub. The second USB host has a bus, and is directly connected to the USB port without routing through any USB hub. The interface converter is configured to convert the signal compatible with a lightning bolt interface to a display port signal. The second interface conversion circuit is configured to convert the display port signal to a VGA signal, and output the VGA signal to a VGA port. Wherein the USB port comprises a first set of pins and a second set of pins, the first set of pins and the second set of pins are connected to a connector compatible with USB 2.0 and a connector compatible with USB 3.0, respectively, and the USB hub is a USB 2.0 hub.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
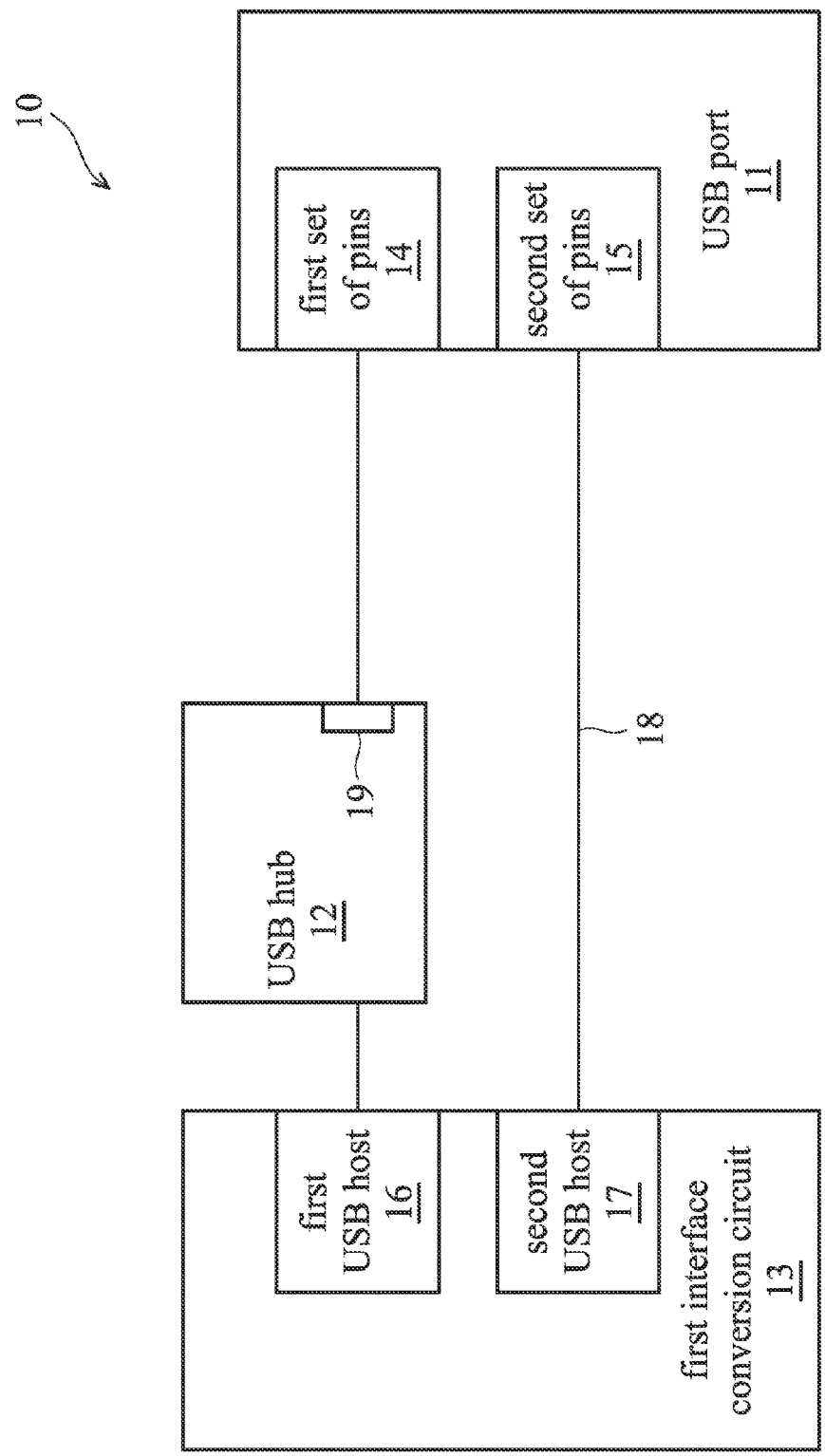
FIG. 1 is a diagram showing an embodiment of an interface extension device of the invention.

FIG. 1 is a schematic diagram of an interface extension device according to an embodiment of this disclosure. As shown in FIG. 1, the interface extension device 10 comprises a USB port 11, a USB hub 12 and a first interface conversion circuit 13. For example, the interface extension device 10 can be a docking or a dongle, but it is not limited thereto. The first interface conversion circuit 13 is configured to connect the interface extension device 10 to other devices, such as a notebook, a desktop or a hub, but not limited thereto. The I/O port connected to the first interface conversion circuit 13 can be an I/O port compatible with USB 2.0 and/or USB 3.0 or a Mini Display Port compatible with the lightning bolt interface, but it is not limited thereto. The first interface conversion circuit 13 further comprises a first USB host 16 and a second USB host 17. The first USB host 16 is a USB 2.0 host and the second USB host 17 is a USB 3.0 host. Operations of the first USB host 16 and the second USB host 17 are the same as traditional USB 2.0 host and traditional USB 3.0 host respectively, so details thereof are omitted for brevity. The first USB host 16 is connected to the USB hub 12, and is connected to the USB port 11 through the USB hub 12. The second USB host 17 has a bus 18, and the second USB host 17 is directly connected to the USB port 11 without routing through any USB hub.

In one embodiment, when the first interface conversion circuit 13 is connected to a notebook supporting USB 3.0, the USB signals from the notebook would be delivered to the first USB host 16 and the second USB host 17 simultaneously, due to the standard of the USB 3.0 having the characteristics of downward compatibility. In another embodiment, when the first interface conversion circuit 13 is connected to the notebook supporting USB 2.0, the signal from the notebook would only be delivered to the first USB host 16. In another embodiment, when the first interface conversion circuit 13 is connected to the mini display port of the notebook supporting the lightning bolt interface, the signals from the notebook would be delivered to the first USB host 16 and the second USB host 17, respectively.

The USB hub 12 is configured to deliver the signal from the first interface conversion circuit 13 to the USB port 11 or to deliver the signal from the USB port 11 to the first interface conversion circuit 13. In this embodiment, the USB hub 12 is the hub compatible with USB 2.0. The USB hub 12 further delivers the signal from the first USB host 16 to other USB ports compatible with USB 2.0 standard. The operation of the USB hub 12 is the same as the conventional USB 2.0 hub, and thus the details thereof are omitted for brevity. The USB port 11 has a first set of pins 14 and a second set of pins 15, and the first set of pins 14 and the second set of pins 15 are compatible with the connectors of USB 2.0 and USB 3.0, respectively. In the present embodiment, the first set of pins 14 are electrically connected to a first port 19 of the USB hub 12 while the second set of pins 15 are directly electrically connected to the bus 18 of the second USB host 17. In other words, in the present embodiment, the USB port 11 has a slot (not shown) arranged to connect to a plug compatible with USB standard, and this plug can be compatible with USB 2.0 and USB 3.0. For example, the external device connected to the USB port can be a product (i.e., a keyboard, a mouse, a printer, a flash drive, a camera, a hub, an external hard drive, a Bluetooth device, or a card reader) compatible with USB I/O interface standards, but it is not limited thereto.

According to the I/O interface of the external device connected to the interface extension device 10, the interface extension device 10 has the following operations. When the external device is connected to the USB port 11 through the connector compatible with the USB 2.0, the first USB host 16 communicates with the external device through the USB hub 12. When the external device is connected to the USB port 11 through the connector compatible with the USB 3.0, the second USB host 17 directly communicates with the external device through the bus 18. Therefore, the interface extension device 10 can enable a first external device connected to the first interface conversion circuit 13 to communicate with a second device connected to the USB port 11 using USB 3.0 standard or USB 2.0 standard without the USB 3.0 hub.

Figure 2:
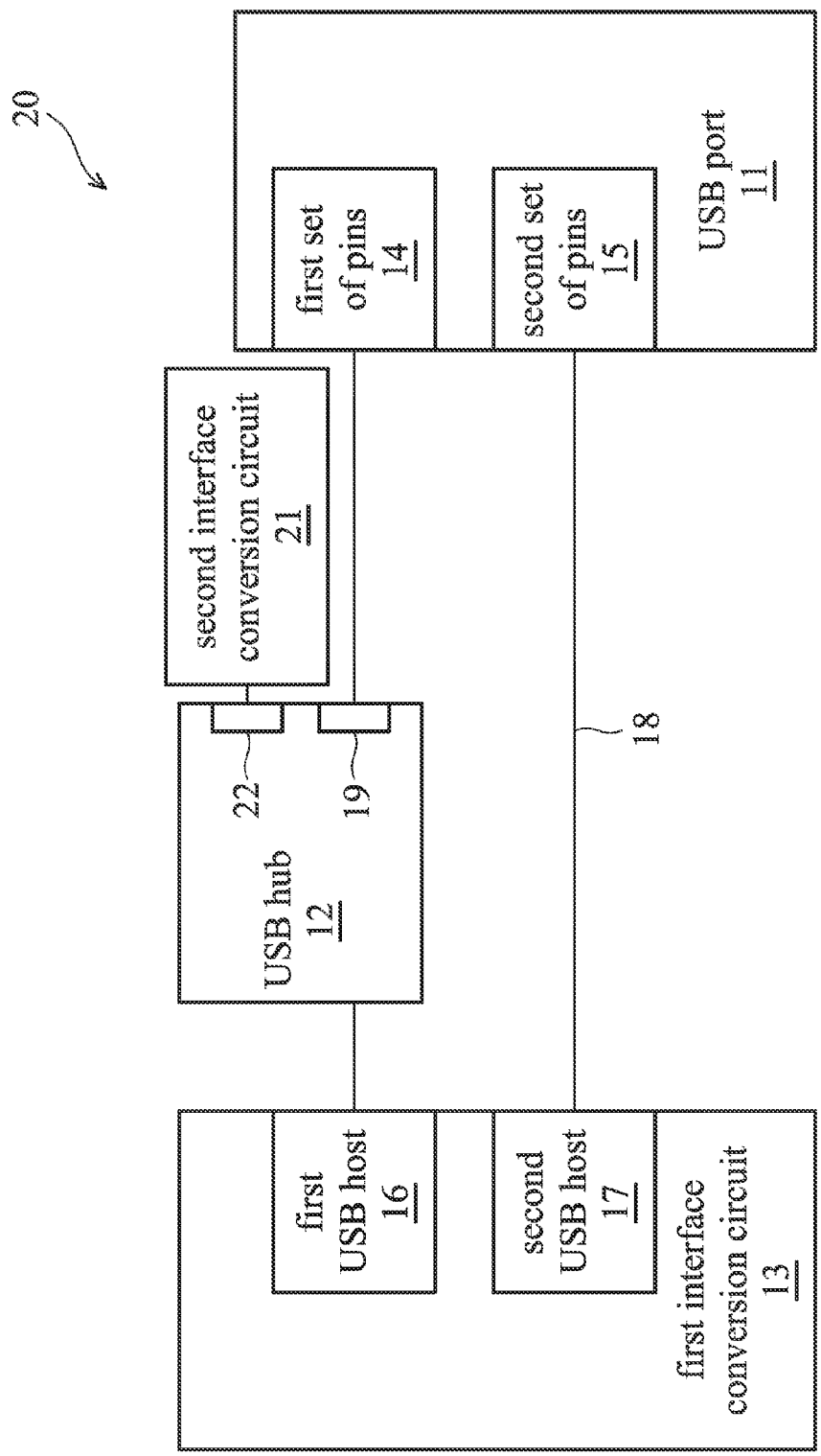
FIG. 2 is a diagram of another embodiment of the interface extension device of the invention.

FIG. 2 is another schematic diagram of the interface extension device according to another embodiment of this disclosure. As shown in FIG. 2, the interface extension device 20 is similar to the interface extension device 10 shown in FIG. 1. The difference is in that the interface extension device 20 further comprises a second interface conversion circuit 21, and the USB hub 12 further comprises a second port 22. The second interface conversion circuit 21 is configured to convert the signal from the first USB host 16 to network packages, and to convert the network packages to the USB signal. For example, the second interface conversion circuit 21 has a slot configured to connect to the RJ45 network connector of the external device. Furthermore, the second interface conversion circuit 21 converts the signal from the first USB host 16 into the network packages through the USB hub 12, and delivers the network packages to the external device connected to the second interface conversion circuit 21 for communication. For example, the external device connected to the second interface conversion circuit 21 can be a computer, a hub, a switching hub, or an IP switcher, but it is not limited thereto. The connector connected to the external device of the second interface conversion circuit 21 can be a RJ45 compatible connector, but it is not limited thereto. Therefore, the interface extension device 20 can enable a first external device connected to the first interface conversion circuit 13 to communicate with a second external device connected to the USB port 11 using USB 3.0 or USB 2.0 standard, and enable the first external device to transfer the network packages to and receive the network packages from a third external device connected to the second interface conversion circuit 21.

Figure 3:
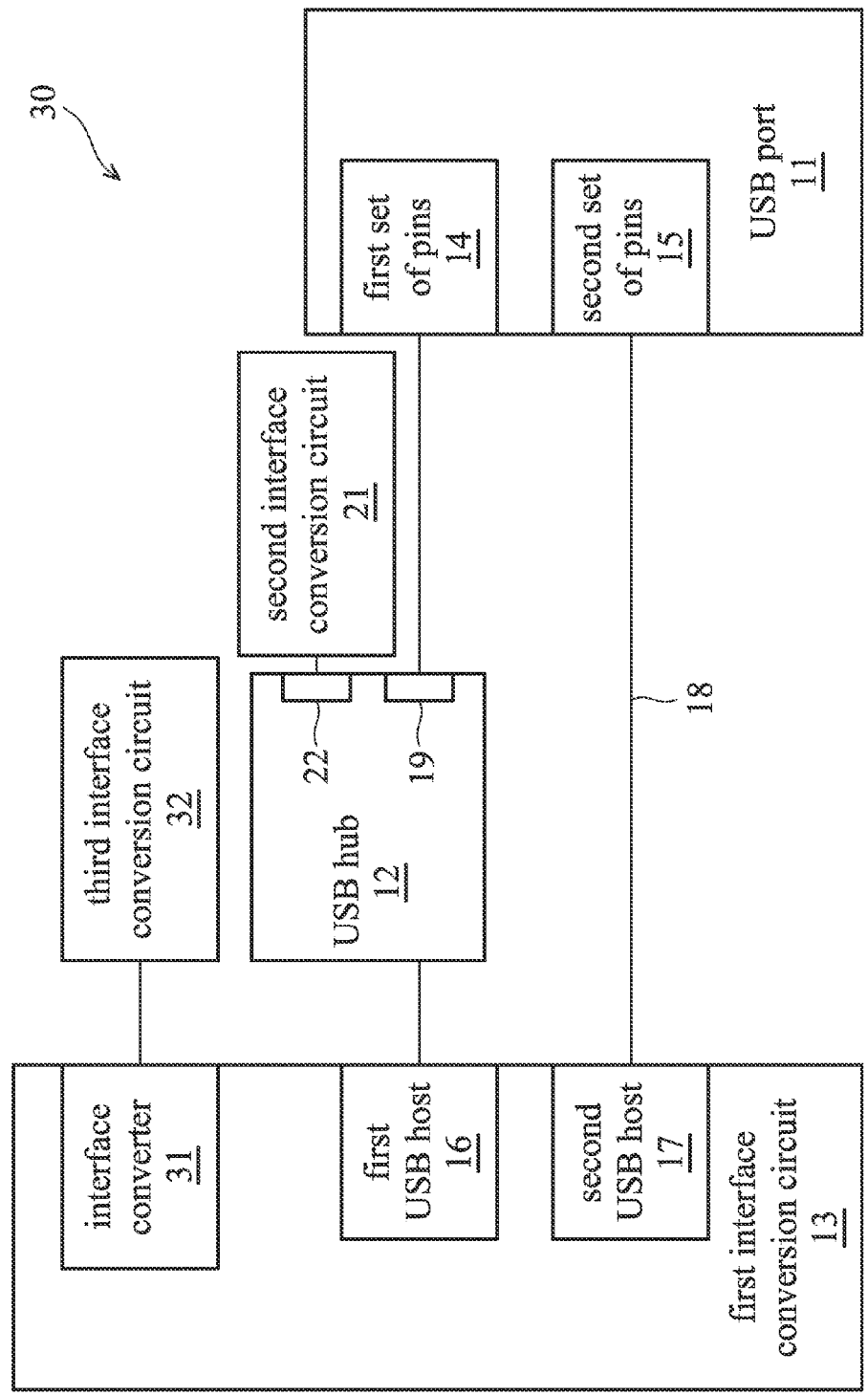
FIG. 3 is a diagram of another embodiment of the interface extension device of the invention.

FIG. 3 is another schematic diagram of the interface extension device according to another embodiment of this disclosure. As shown in FIG. 3, the interface extension device 30 is similar to the interface extension device 20 shown in FIG. 2. The difference is in that the interface extension device 30 further comprises a third interface conversion circuit 32, and the first interface conversion circuit 13 further comprises an interface converter 31. The interface converter 31 is configured to convert the signal compatible with a lightning bolt interface to a display port signal, and the third interface conversion circuit 32 is configured to convert the display port signal to a VGA signal. For example, the external device connected to the third interface conversion circuit 32 can be a computer monitor, a monitor, a projector, or a television, but it is not limited thereto. The connector connected to the external device and the third interface conversion circuit 32 can be a connector compatible with the standard of the VGA port or DVI, but it is not limited thereto. In an embodiment, a projector can be connected to the third interface conversion circuit 32 by the VGA connector. In another embodiment, the interface extension device 30 is connected to a connector compatible with the lightning bolt interface of the notebook, and a USB hard disk compatible with the standard of USB 3.0 can be enabled to communicate with the notebook under the standard of USB 3.0 through the USB port 11. Furthermore, the notebook can also be connected to the external network device through the second interface conversion circuit 21 of the interface extension device 30, and outputs images to an external projector through the third interface conversion circuit 32, simultaneously.

Therefore, the interface extension device 30 can enable a first external device connected to the first interface conversion circuit 13 to communicate with a second external device connected to the USB port 11 compatible with the standard of USB 3.0 and USB 2.0, without a USB 3.0 Hub. In addition, the interface extension device 30 can also enable the first external device to transfer a network package to or to receive a network package from a third external device connected to the second interface conversion circuit 21. Furthermore, the interface extension device 30 can further enable the first external device to transfer images with a forth external device connected to the third interface conversion circuit 32.

Above all, the interface extension device in the present disclosure can provide the transmission compatible with the standard of USB 3.0 without using the USB 3.0 hub, and thus, the production cost of the entire interface extension device can be reduced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interface extension device, comprising:
   a USB port;
   a USB hub, having a first port connected to the USB port; and
   a first interface conversion circuit, comprising:
      a first USB host, connected to the USB hub and connected to the USB port through the USB hub; and
      a second USB host, having a bus and being directly connected to the USB port without routing through any USB hub, wherein the USB port comprises a first set of pins and a second set of pins, and the first set of pins and the second set of pins are arranged to connect to a connector compatible with USB 2.0 and a connector compatible with USB 3.0, respectively, and the USB hub is a USB 2.0 hub, wherein when an external device is connected to the USB port through the connector compatible with USB 3.0, the second USB host directly connects to the external device through the bus and the second set of pins of the USB port rather than any USB hub and communicates with the external device, wherein the USB hub further comprises a second port connected to a second interface conversion circuit, and configured to convert a USB signal from the first USB host to a network package, and convert the network package to the USB signal;
   wherein the first USB host communicates with the external device through the USB hub and the first set of pins of the USB port, when the external device is connected to the USB port through the connector compatible with USB 2.0.

2. The interface extension device as claimed in claim 1, wherein the first interface conversion circuit further comprises an interface converter configured to convert a signal compatible with a lightning bolt interface to a display port signal, and the interface extension device further comprises a third interface conversion circuit configured to convert the display port signal to a VGA signal and output the VGA signal to a VGA port.

3. The interface extension device as claimed in claim 1, wherein the interface extension device is a docking or a dongle.

4. An interface extension device, comprising:
   a USB port;
   a USB hub, having a first port connected to the USB port;
   a first interface conversion circuit, comprising;
      a first USB host, connected to the USB hub and connected to the USB port through the USB hub;
      a second USB host, having a bus and directly connected to the USB port without routing through any USB hub, wherein the USB port comprises a first set of pins and a second set of pins, the first set of pins and the second set of pins are connected to a connector compatible with USB 2.0 and a connector compatible with USB 3.0, respectively, and the USB hub is a USB 2.0 hub, wherein when an external device is connected to the USB port through the connector compatible with USB 3.0, the second USB host directly connects to the external device through the bus and the second set of pins of the USB port rather than any USB hub and communicates with the external device; and
      an interface converter, configured to convert a signal compatible with a lightning bolt interface to a display port signal; and
   a third interface conversion circuit, configured to convert the display port signal to a VGA signal, and output the VGA signal to a VGA port;
   wherein the USB hub further comprises a second port connected to a second interface conversion circuit, and configured to convert a USB signal from the first USB host to a network package and convert the network package to the USB signal; and
   wherein the first USB host communicates with the external device through the USB hub and the first set of pins of the USB port, when the external device is connected to the USB port through the connector compatible with USB 2.0.

5. An interface extension device, comprising:
   a USB port;
   a USB hub, having a first port connected to the USB port;
   a first interface conversion circuit, comprising;
      a first USB host, connected to the USB hub and connected to the USB port through the USB hub;
      a second USB host, having a bus, and directly connected to the USB port without routing through any USB hub, wherein the USB port comprises a first set of pins and a second set of pins, the first set of pins and the second set of pins are connected to a connector compatible with USB 2.0 and a connector compatible with USB 3.0, respectively, and the USB hub is a USB 2.0 hub, wherein when an external device is connected to the USB port through the connector compatible with USB 3.0, the second USB host directly connects to the external device through the bus and the second set of pins of the USB port rather than any USB hub and communicates with the external device; and
      an interface converter, configured to convert a signal compatible with a lightning bolt interface to a display port signal; and
   a third interface conversion circuit, configured to convert the display port signal to a VGA signal and output the VGA signal to a VGA port.

* * * * *